United States Patent Office 2,956,559
Patented Oct. 18, 1960

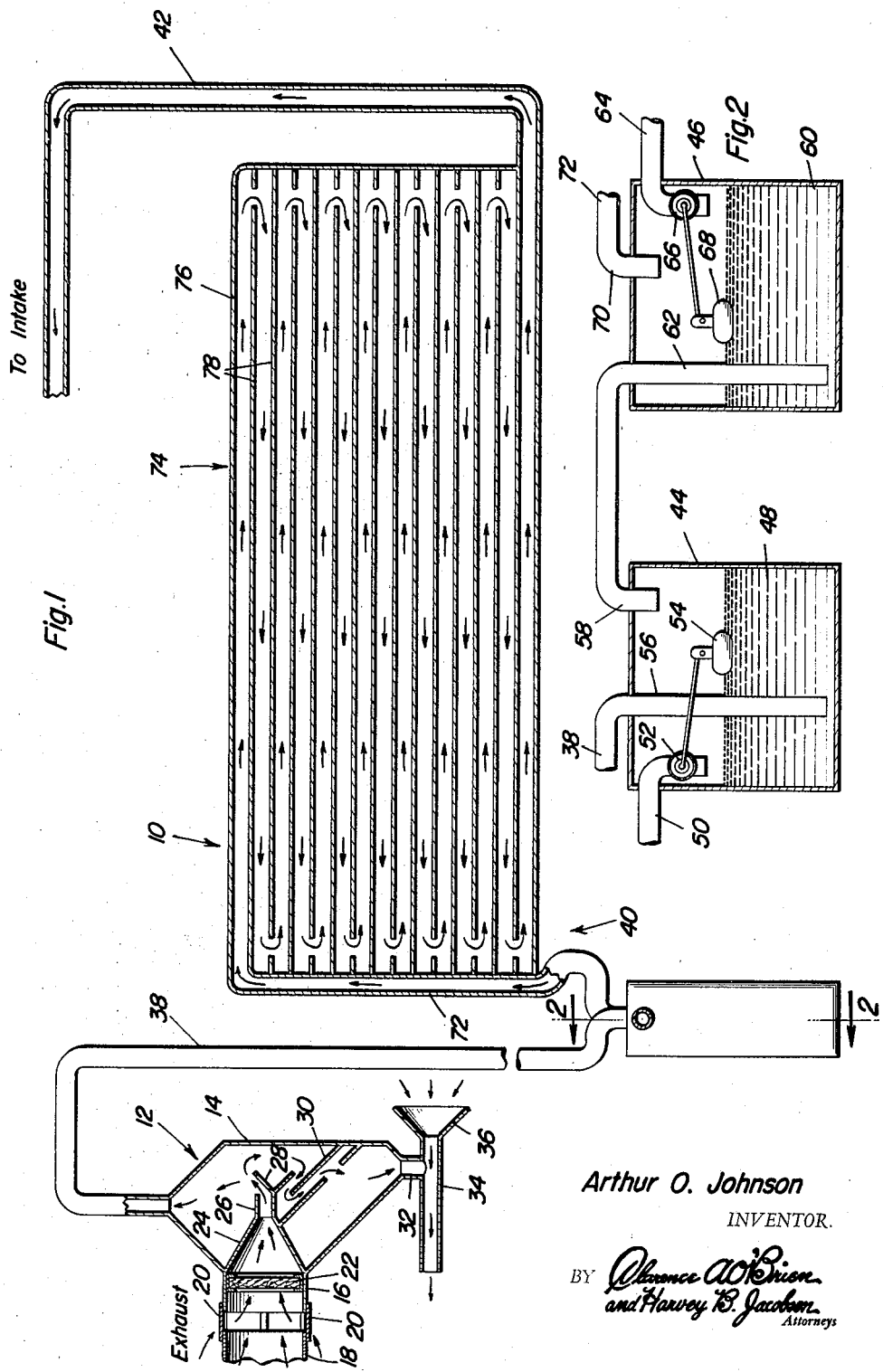

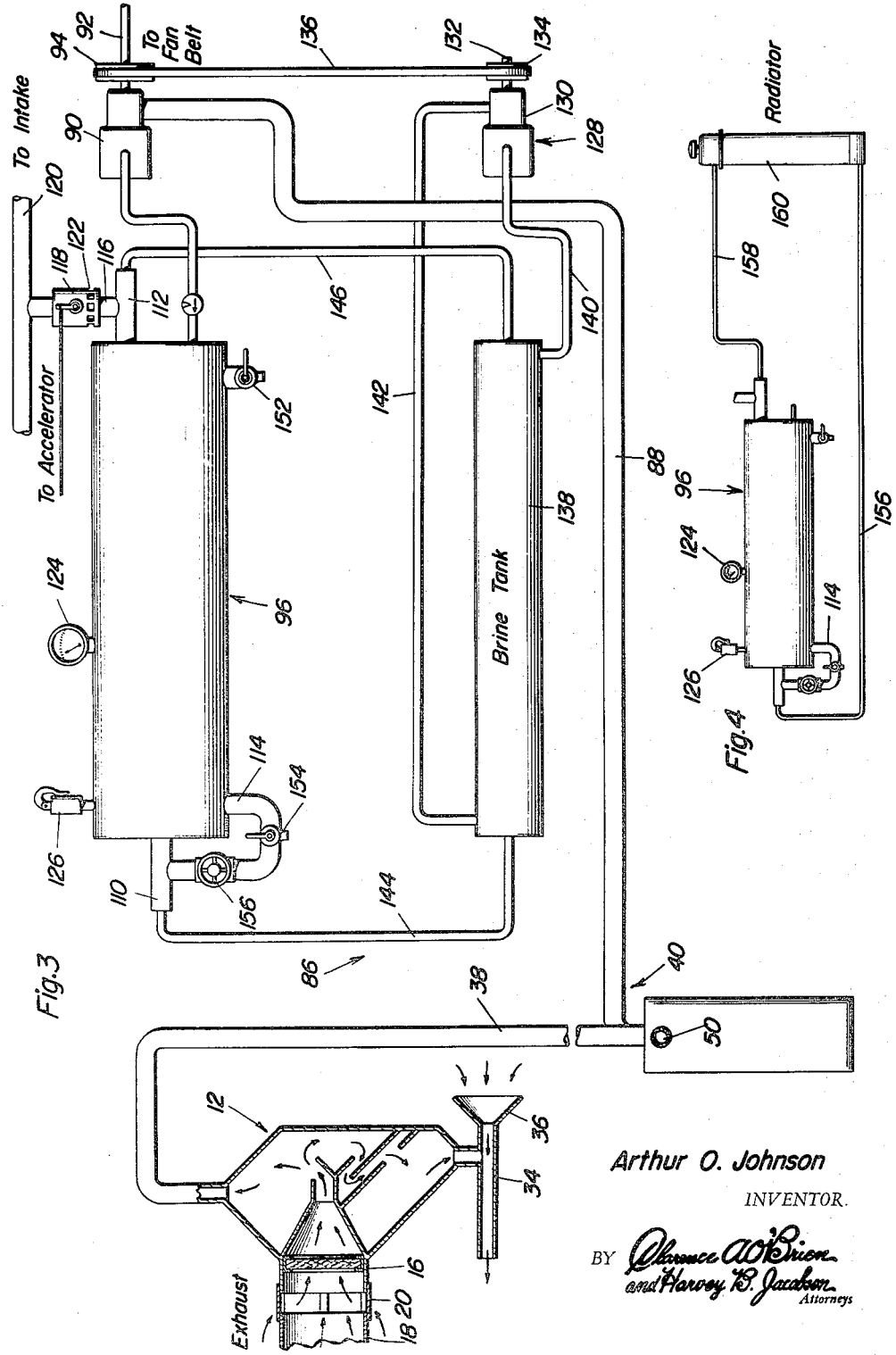

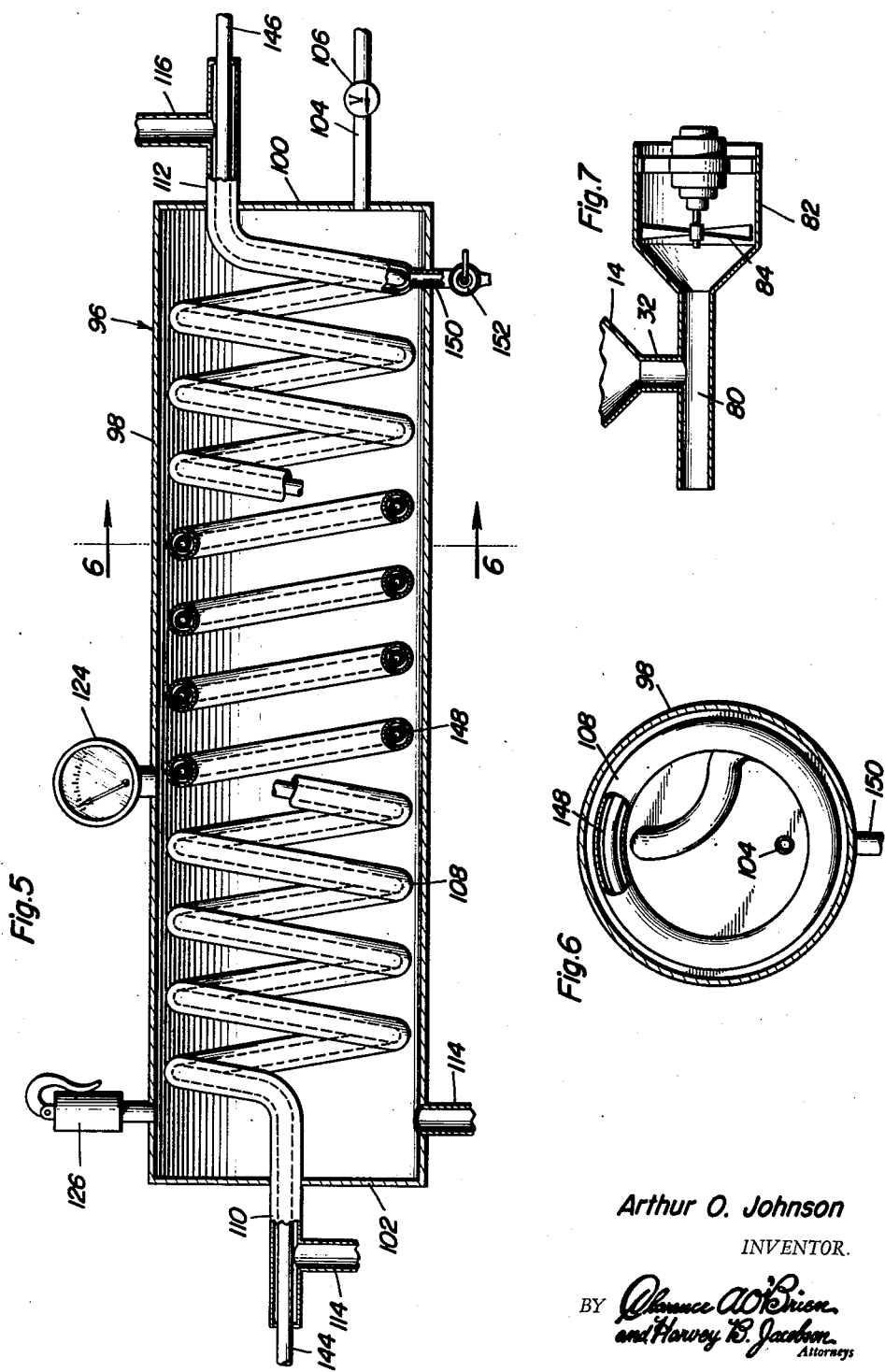

2,956,559

FUEL ECONOMIZER FOR INTERNAL COMBUSTION ENGINES

Arthur O. Johnson, 212 NE. 26th St., Miami 37, Fla.

Filed Nov. 3, 1958, Ser. No. 771,583

10 Claims. (Cl. 123—119)

This invention relates in general to new and useful improvements in accessories for internal combustion engines, and more particularly to a fuel economizer attachment for internal combustion engines.

Due to incomplete and improper combustion, all internal combustion engines run below their maximum efficiency. As a result, the exhaust gases contain many volatile gases which, if salvaged, could be redirected into the internal combustion engine and burned. It is therefore the primary object of this invention to provide a fuel economizer for an internal combustion engine which returns at least a portion of the exhaust gases of the internal combustion engine to the intake thereof to assure a more complete combustion of the exhaust gases and thereby reduce contamination or pollution of the atmosphere by the exhaust gases.

Another object of this invention is to provide a fuel economizer for internal combustion engines, the fuel economizer including an attachment for receiving exhaust gases from an exhaust line of an internal combustion engine, the attachment including a separator which is so constructed that the heavy gases are drawn from the exhaust gases, such heavy gases being the non-volatile gases, the volatile gases being removed from the attachment and returned to the internal combustion engine for burning.

Another object of this invention is to provide an improved fuel economizer for internal combustion engines, the fuel economizer including means for separating from the exhaust gases the volatile gases and returning such volatile gases to the intake of the internal combustion engine, there being disclosed intermediate the separator and the intake a vaporizing attachment which may selectively add either or both vaporized fuel or water vapor to the volatile gases whereby the burning efficiency thereof is increased.

A further object of this invention is to provide an attachment for an internal combustion engine in the form of a fuel economizer, the fuel economizer being of such a nature that the volatile gases normally found in the exhaust gases from an internal combustion engine are salvaged and so treated that when introduced into the intake of the internal combustion engine, a maximum efficiency is obtained.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic view of one of the forms of the invention and shows generally the relationship of the various components thereof;

Figure 2 is a fragmentary sectional view taken substantially upon the plane indicated by the section line 2—2 of Figure 1 and shows the general arrangement of means for adding fuel vapor and water vapor to gases;

Figure 3 is a schematic view of another form of fuel economizer and shows the arrangement of the various components thereof;

Figure 4 is a schematic view of a modified component to be used in lieu of certain of the components of the fuel economizer of Figure 3;

Figure 5 is an enlarged sectional view taken through an expansion chamber and cooling coil assembly of the fuel economizer;

Figure 6 is an enlarged vertical transverse sectional view taken substantially upon the plane indicated by the section line 6—6 of Figure 5 and shows further the details of the expansion chamber and the cooling coil; and Figure 7 is an enlarged fragmentary sectional view showing the provision of a fan for increasing the efficiency of the separator.

Referring now to the drawings in detail, it will be seen that there is illustrated in Figures 1 and 2 a first form of fuel economizer which is referred to in general by the reference numeral 10. The fuel economizer 10 is disposed intermediate the exhaust pipe of an internal combustion engine and the intake thereof. The fuel economizer 10 includes a separator which is referred to in general by the reference numeral 12.

The separator 12 is formed from a housing 14 to which there is connected an intake pipe. The intake pipe 16 is in turn connected to an exhaust pipe 18 for receiving exhaust gases therefrom. It is to be noted that the intake pipe 16 is aligned with the exhaust pipe 18 and is connected thereto by means of straps 20 so that outside air may be drawn into the separator 12 or portions of exhaust gases emitting from the exhaust pipe 18 may escape. This provides for an equalized flow through the separator 12.

In order that carbon particles and the like may be excluded from the separator 12, there is mounted within the intake pipe 16 a filter 22. The filter 22 may be of any desired construction. It is, however, desirable that the filter 20 be replaceable.

The intake pipe 16 opens into a conical portion 24 within the housing 14. The conical portion 24 terminates in a restricted passage 26 through which the flow of exhaust gases into the main part of the separator 12 is controlled.

Disposed in alignment with the passage 26 at the exit end thereof is a baffle 28 for generally directing the gases upwardly in the housing 14. The lighter gases, which are the volatile gases, continue upwardly to the upper part of the housing 14. The heavier gases will be drawn downwardly through a baffle system 30. The provision of the baffle system 30 permits the lighter gases which may be trapped in the heavier gases to escape so that they may also go to the upper part of the housing 14.

In order that the heavier gases, which are the non-volatile gases, may escape from the housing 14, there is provided a discharge passage 32. The discharge passage 32 is in turn connected to a suction line 34 which is provided at the forward end thereof with a funnel shaped entrance opening 36. Flow of air through the suction passage 34 due to the movement of a vehicle in which the internal combustion engine is mounted results in a vacuum in the discharge passage 32 and the resultant drawing of non-volatile gases from the housing 14.

Connected to the upper part of the housing for receiving the volatile gases therefrom is a return line 38. The return line 38 is connected to a vaporizing unit which is referred to in general by the reference numeral 40. The return line 38 includes a head section 42 which is in turn connected to the intake (not shown) of the internal combustion engine.

The vaporizing unit 40 includes a pair of tanks 44 and 46. The tank 44 is preferably a water tank and has disposed therein water 48. The water 48 is supplied to the water tank 44 by means of a water supply line 50 with the level of the water 48 within the water tank 44 being controlled by means of the valve 52 which is actuated by means of a float 54.

The return pipe 38 has a portion 56 which extends down into the water tank 44 below the level of the water 48. Thus the volatile gases salvaged by the separator 12 must pass down into the water 48 and bubble up therethrough. A collector pipe 58 receives the volatile gases after they have passed through the water 48. The collector pipe 58 extends into the tank 46 which is a fuel tank and which has disposed therein fuel 60. The collector pipe 58 includes a vertical portion 62 which extends down into the fuel tank 46 below the level of the fuel 60.

The fuel tank 46 may be connected to the fuel system of the internal combustion engine by means of a fuel line 64. Flow of fuel into the fuel tank 46 is controlled by means of a valve 66 which is actuated by means of a float 68 to retain a constant level of the fuel 60.

Opening through the top of the fuel tank 46 is a collector pipe 70 which is in turn a part of a return line section 72.

It is to be understood that the volatile gases, after passing through the water tank 44 and the fuel tank 46 will be cleaned and contain both water vapor and fuel vapor as well as particles of water and fuel. The return line section 72 is in turn connected to a vaporizing chamber which is referred to in general by the reference numeral 74. The vaporizing chamber 74 is in the form of a housing 76 which has a plurality of baffles 78 disposed therein. The ends of the baffles 78 are so spaced that the gases passing through the vaporizing chamber 74 must follow a tortuous path as indicated by the arrows in Figure 1. In the vaporizing chamber 74, vaporization of the water particles and the fuel particles is completed in order that the volatile gases exiting from the head pipe 42 may be completely vaporized, together with the fuel and water particles.

It is to be understood that the volatile gases which are supplied to the intake of the internal combustion engine by the head pipe 42 are those which are normally lost to the atmosphere along with the undesirable non-volatile exhaust gases. These gases, either treated or untreated, when returned to the internal combustion engine, will greatly increase the efficiency thereof. Furthermore, by treating these volatile gases, their effect on the efficiency of the internal combustion engine is greatly increased.

Referring now to Figure 7 in particular, it will be seen that there is illustrated a modified form of vacuum line which is referred to by the reference numeral 80 and which replaces the vacuum line 34. The vacuum line 80 is provided with a generally cylindrical intake 82 in which there is mounted a blower 84. The blower 84 both permits the operation of the separator 12 when the vehicle is standing still and increases the efficiency of the separator when the vehicle is operating.

Referring now to Figures 3, 5 and 6 in particular, it will be seen that there is illustrated a modified form of fuel economizer which is referred to in general by the reference numeral 86. The fuel economizer 86 includes certain of the components of the fuel economizer 10. These include the separator 12, the exhaust pipe 18, the intake pipe 16 and the straps 20. They also include the vacuum pipe 34 and the intake 36. In addition to these components, there is the vaporizing unit 40 which is attached to the separator 12 by the return line 38. Extending from the vaporizing unit 40 is a return line head pipe 88. The return line head pipe 88 is in turn connected to a compressor 90 which is driven by means of a drive shaft 92 on which a pulley 94 is mounted. The drive shaft 92 is suitably connected to the internal combustion engine of the vehicle and driven thereby.

The fuel economizer 86 also includes an expansion chamber or cooler which is referred to in general by the reference numeral 96. The expansion chamber or cooler 96 is in the form of a cylindrical housing 98 having opposite ends 100 and 102. Extending from the compressor 90 and opening into the expansion chamber 96 through the end 100 is a reduced cross-sectional volatile gas return line 104. Mounted in the return line 104 is a check valve 106.

Extending through the expansion chamber 96 is a coil 108. The coil 108 includes an inlet 110 which extends through the end wall 102, and an outlet 112 which extends through the end wall 100. The coil 108 is communicated with the interior of the expansion chamber 96 by means of a U-shaped line 114 which is connected to the inlet portion 110. The outlet portion 112 is connected by means of a pipe 116 to a control valve 118 which is in turn connected to a pipe 120 which leads through any desired form of intake which may be mounted on the internal combustion engine. The valve 118 is provided with a plurality of air openings 122 so that outside air may be admitted to the intake, together with the volatile gases.

The expansion chamber 96 is provided with a pressure gauge 124 for determining the pressure of the exhaust gases therein. Also, a safety valve 126 is provided in the event the volatile gases in the expansion chamber 96 reach too high a pressure.

The fuel economizer 86 also includes a refrigeration unit which is referred to in general by the reference numeral 128. The refrigeration unit 128 includes a refrigeration component 130 which is driven by means of a drive shaft 132. The drive shaft 132 carries a pulley 134 which is connected to the pulley 94 by means of a drive belt 136. The refrigeration unit 128 also includes a brine tank 138 which is cooled by means of refrigeration lines 140 and 142 which are connected to the refrigeration component 130. Extending from opposite ends of the brine tank 138 are brine lines 144 and 146, the line 146 being a return line and the line 144 being a supply line. Disposed within the coil 108 is a second coil 148. Connected to opposite ends of the coil 148 are the brine lines 144 and 146, as is best shown in Figure 5.

In order that condensate may be removed from the coil 108, there is connected to the lower part of the coil 108, as is best illustrated in Figure 5, a condensate line 150. The condensate line 150 extends outwardly of the cylindrical housing 98 and flow therethrough is controlled by means of a petcock 152. Condensate is also removed from the expansion chamber 96 by means of a petcock 154 mounted in the U-shaped pipe 114. Flow of gases through the U-shaped pipe 114 is also controlled by means of a valve 156.

Inasmuch as the volatile gases pass through the coil 108 about the coil 148, which is a brine coil, immediately before returning to the internal combustion engine, it will be seen that the volatile gases are suddenly cooled. This will result in the condensation of excess gases, vapor, either water or fuel, carried by the volatile gases. By so doing, the volumetric efficiency of the volatile gases may be that desired for maximum efficiency.

Referring now to Figure 4 in particular, it will be seen that the expansion chamber 96 is modified in its operation in that the lines 144 and 146 have been replaced by lines 156 and 158, respectively. These lines are connected to the vehicle radiator 160 so that in lieu of cool brine water being passed through the coil 148, heated water from the radiator will be passed through the coil 148. Thus in lieu of cooling the volatile gases prior to their entry into the internal combustion engine intake, the gases will be heated. When the gases are heated, they will carry a larger volume of vapor, either fuel or water. Under certain conditions this is also desirable in order to obtain the maximum efficiency of the returned volatile gases.

It is also to be understood that if it is so desired, the cooling system of Figure 3 may have an additional function in air conditioning the vehicle and the system of Figure 4 may be used in the heating of a vehicle. Also, the use of the invention is not to be limited to vehicles, but will have many industrial applications. Furthermore, the salvaged gases need not be returned to the internal combustion engine producing the gases, but may be stored or used in other systems.

In view of the foregoing, it will be readily apparent that there has been devised a fuel economizer for internal combustion engines, which fuel economizer is of such a nature whereby it may salvage the volatile gases of the exhaust gases while discarding the non-volatile gases thereof. Furthermore, by properly treating the volatile gases, when the volatile gases are returned to the internal combustion engine, the efficiency of the internal combustion engine is greatly increased.

The foregoing is considered as illustrative only of the principles of the invention. Further, since numerous modifications and equivalents will readily occur to those skilled in the art, it is not desired to limit the invention to the exact construction and operation shown and described, and accordingly, all suitable modifications and changes may be resorted to, falling within the scope of the invention as claimed.

What is claimed as new is as follows:

1. A fuel economizer for an internal combustion engine, said fuel economizer comprising a fitting for attachment to an exhaust pipe for receiving exhaust gases therefrom, a gas separator connected to said fitting for separating and removing non-volatile gases from the volatile gases, a return line for returning the volatile gases to the intake of the internal combustion engine, and vaporizing means in said return line, said vaporizing means including a fuel tank and means for passing said volatile gases through fuel in said fuel tank, and a vaporizing chamber receiving gases from said fuel tank.

2. A fuel economizer for an internal combustion engine, said fuel economizer comprising a fitting for attachment to an exhaust pipe for receiving exhaust gases therefrom, a gas separator connected to said fitting for separating and removing non-volatile gases from the volatile gases, a return line for returning the volatile gases to the intake of the internal combustion engine, and vaporizing means in said return line, said vaporizing means including a water tank and means for passing said volatile gases through water in said water tank, and a vaporizing chamber receiving gases from said water tank.

3. A fuel economizer for an internal combustion engine, said fuel economizer comprising a fitting for attachment to an exhaust pipe for receiving exhaust gases therefrom, a gas separator connected to said fitting for separating and removing non-volatile gases from the volatile gases, a return line for returning the volatile gases to the intake of the internal combustion engine, and vaporizing means in said return line, said vaporizing means including a fuel tank and means for passing said volatile gases through fuel in said fuel tank and a water tank and means for passing said volatile gases through water in said water tank, and a vaporizing chamber receiving gases from said fuel tank and said water tank.

4. A fuel economizer for an internal combustion engine, said fuel economizer comprising a fitting for attachment to an exhaust pipe for receiving exhaust gases therefrom, a gas separator connected to said fitting for separating and removing non-volatile gases from the volatile gases, a return line for returning the volatile gases to the intake of the internal combustion engine, vaporizing means in said return line, said vaporizing means including a pair of cleansing tanks containing fuel and water through which said volatile gases are bubbled to cleanse the gases, to enrich the gases with fuel and to supply the gases with appreciable amounts of water vapor, and a compressor for compressing said volatile gases prior to entry into said intake.

5. A fuel economizer for an internal combustion engine, said fuel economizer comprising a fitting for attachment to an exhaust pipe for receiving exhaust gases therefrom, a gas separator connected to said fitting for separating and removing non-volatile gases from the volatile gases, a return line for returning the volatile gases to the intake of the internal combustion engine, vaporizing means in said return line, said vaporizing means including a pair of cleansing tanks containing fuel and water through which said volatile gases are bubbled to cleanse the gases, to enrich the gases with fuel and to supply the gases with appreciable amounts of water vapor, and a cooler subsequent to said vaporizing means.

6. A fuel economizer for an internal combustion engine, said fuel economizer comprising a fitting for attachment to an exhaust pipe for receiving exhaust gases therefrom, a gas separator connected to said fitting for separating and removing non-volatile gases from the volatile gases, a return line for returning the volatile gases to the intake of the internal combustion engine, vaporizing means in said return line, said vaporizing means including a pair of cleansing tanks containing fuel and water through which said volatile gases are bubbled to cleanse the gases, to enrich the gases with fuel and to supply the gases with appreciable amounts of water vapor, and a further vaporizer subsequent to said vaporizing means.

7. A fuel economizer for an internal combustion engine, said fuel economizer comprising a fitting for attachment to an exhaust pipe for receiving exhaust gases therefrom, a gas separator connected to said fitting for separating and removing non-volatile gases from the volatile gases, a return line for returning the volatile gases to the intake of the internal combustion engine, vaporizing means in said return line, said vaporizing means including a pair of cleansing tanks containing fuel and water through which said volatile gases are bubbled to cleanse the gases, to enrich the gases with fuel and to supply the gases with appreciable amounts of water vapor, a compressor for compressing said volatile gases prior to entry into said intake, and a condensor subsequent to said compressor.

8. A fuel economizer for an internal combustion engine, said fuel economizer comprising a fitting for attachment to an exhaust pipe for receiving exhaust gases therefrom, a gas separator connected to said fitting for separating and removing non-volatile gases from the volatile gases, a return line for returning the volatile gases to the intake of the internal combustion engine, vaporizing means in said return line, a compressor for compressing said volatile gases prior to entry into said intake, and a further vaporizer subsequent to said compressor.

9. A fuel economizer for an internal combustion engine, said fuel economizer comprising a fitting for attachment to an exhaust pipe for receiving exhaust gases therefrom, a gas separator connected to said fitting for separating and removing non-volatile gases from the volatile gases, a return line for returning the volatile gases to the intake of the internal combustion engine, vaporizing means in said return line, said vaporizing means including a pair of cleansing tanks containing fuel and water through which said volatile gases are bubbled to cleanse the gases, to enrich the gases with fuel and to supply the gases with appreciable amounts of water vapor, a compressor for compressing said volatile gases prior to entry into said intake, and a cooler subsequent to said compressor, said cooler including a cooling coil and an expansion chamber.

10. A fuel economizer for an internal combustion engine, said fuel economizer comprising a fitting for attachment to an exhaust pipe for receiving exhaust gases therefrom, a gas separator connected to said fitting for separating and removing non-volatile gases from the volatile gases, a return line for returning the volatile gases to the intake of the internal combustion engine, vaporizing means in said return line, a compressor for compressing said volatile gases prior to entry into said intake, and a further vaporizer subsequent to said compressor, said further vaporizer including a heating coil and an expansion chamber.

References Cited in the file of this patent

UNITED STATES PATENTS

| | | |
|---|---|---|
| 1,961,444 | Lewis | June 5, 1934 |
| 2,147,670 | Pratt | Feb. 21, 1939 |
| 2,147,671 | Pratt | Feb. 21, 1939 |
| 2,300,774 | Cartmell | Nov. 3, 1942 |
| 2,349,675 | Pratt | May 23, 1944 |
| 2,349,676 | Pratt | May 23, 1944 |
| 2,430,852 | Allen | Nov. 18, 1947 |
| 2,715,392 | Grevas | Aug. 16, 1955 |